April 20, 1965 H. D. KESLING 3,178,820
INTRA-ORAL TOOTH POSITIONER
Filed Feb. 19, 1962 2 Sheets-Sheet 1

INVENTOR:
HAROLD D. KESLING
BY
ATT'YS

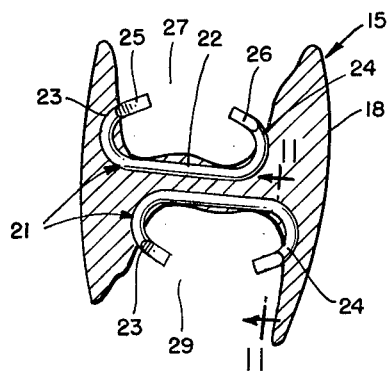
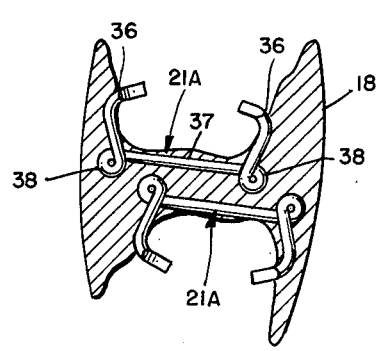
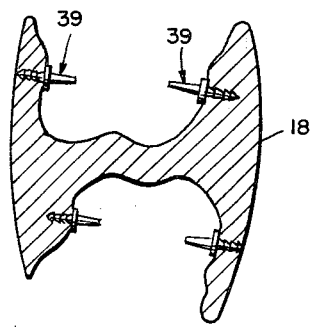
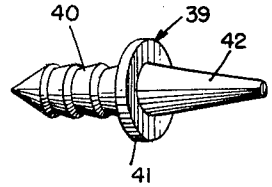
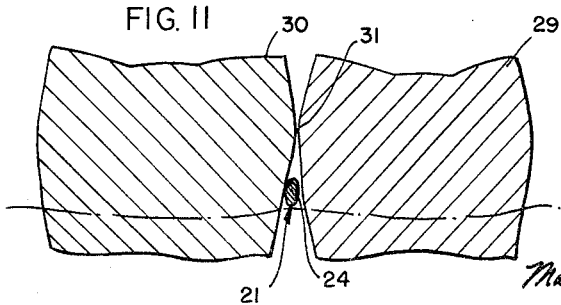
INVENTOR:
HAROLD D. KESLING

United States Patent Office 3,178,820
Patented Apr. 20, 1965

3,178,820
INTRA-ORAL TOOTH POSITIONER
Harold D. Kesling, R.R. 2, La Porte, Ind.
Filed Feb. 19, 1962, Ser. No. 174,174
9 Claims. (Cl. 32—14)

This invention relates in general to dental appliances, and more particularly to a resilient dental appliance worn in the mouth of a person and having means to assure proper fit and orientation of the appliance relative to the teeth. Still more particularly, the present invention relates to a tooth positioning dental appliance capable of urging teeth into preselected positions, such as shown in my Patent No. 2,531,222, wherein means is provided for the appliance to aid in the proper placement of the appliance in the mouth thereby obtaining the most effective usage of the appliance.

Some difficulty has been encountered in the usage of dental appliances worn in the mouth, and especially the tooth positioning appliance of the aforementioned patent, wherein the appliance in certain cases is difficult to properly position and seat against the teeth. For example, the tooth positioning appliance of the aforementioned patent is prepared to urge certain teeth into preselected positions, thereby necessitating elongation and/or stretching of the appliance when placing it in the mouth in order to effect proper seating of the appliance against the teeth. And unless the appliance is properly placed within the mouth, the usefulness is materially, if not completely impaired.

The above problem is overcome by the present invention, wherein positive means is provided to effect proper placement of the appliance within the mouth.

Accordingly, it is an object of the present invention to obviate the above mentioned difficulties and provide an improved dental appliance.

A further object of this invention is to provide a dental appliance having a resilient body with at least the impression therein of the upper or lower teeth, and wherein means are associated with the resilient appliance to effect proper mating engagement between the appliance and the teeth when the appliance is positioned within the mouth.

A still further object of the present invention resides in the provision of a resilient dental appliance having an impression of at least the upper or lower teeth of a person, and wherein positioning elements in the form of C-shaped clips are carried by the appliance for effecting temporary coupling between the appliance and the teeth by engagement in the embrasure areas of the teeth.

A further object of this invention is to provide a dental appliance capable of effecting tooth positioning movements of teeth and including a rubber body having the impression of at least the upper or lower teeth of a person, and wherein means is provided to aid in the proper placement of the appliance in the mouth of a person including pins secured to the rubber body and adapted to engage in embrasure areas of the teeth.

A still further object of this invention is in the provision of a tooth positioning appliance having a body of rubber with at least the impression of the upper or lower teeth formed therein in such a manner as to urge certain teeth into preselected positions, and wherein means are provided to assist and assure the proper placement of the appliance in the mouth including C-shaped clips embedded in the rubber body and adapted to engage in the embrasure areas of the teeth and finger engaging portions formed on the appliance.

A still further object of this invention is to provide a tooth positioning appliance including a body of arch-shaped rubber with teeth sockets formed therein corresponding to the upper and/or lower teeth of a person, and wherein means is provided on the appliance to assure proper seating of the teeth in their respective sockets in the appliance.

Other objects, features and advantages of the invention will be apparent from the following detailed disclosure, taken in conjunction with the accompanying sheets of drawings, wherein like reference numerals refer to like parts, in which:

FIG. 7 is a transverse sectional view taken substantially along line 7—7 of FIG. 6 and illustrating one form of positioning means or clip employed for obtaining proper positioning of the dental appliance in a person's mouth, and showing teeth in phantom view;

FIG. 8 is a transverse sectional view similar to FIG. 7, but showing a modified form of a positioning means or clip;

FIG. 9 is a transverse sectional view similar to FIGS. 7 and 8, but showing still another modified form of positioning means wherein pins are provided;

FIG. 10 is an enlarged perspective view of one of the pins used in the embodiment of FIG. 9 wherein it is removed from the appliance; and FIG. 11 is an enlarged transverse sectional view taken substantially along line 11—11 of FIG. 7.

Figure 1:
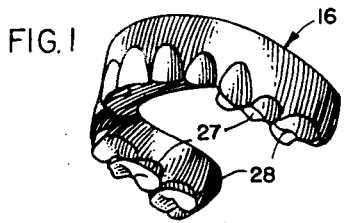
FIG. 1 is a perspective view of a model of teeth from the upper arch which represents the upper teeth in a person.
Figure 2:
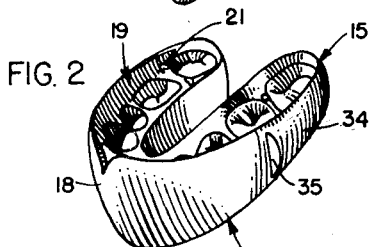
FIG. 2 is a top perspective view of a dental appliance constructed in accordance with the invention and illustrating the impression for the upper arch.
Figure 3:
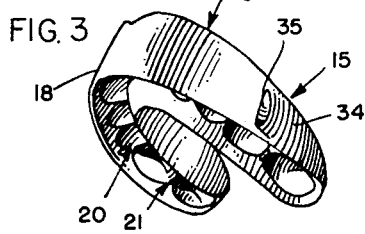
FIG. 3 is a bottom perspective view of the dental appliance of FIG. 2 and illustrating the impression of the lower arch.
Figure 4:
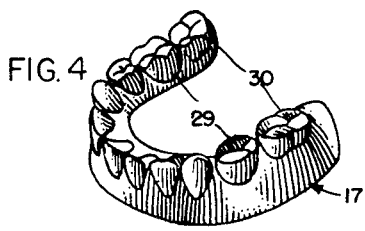
FIG. 4 is a perspective view of a model of the teeth from the lower arch of a person which would be received in the impression in the dental appliance as shown in FIG. 3.

Referring now to the drawings, and more particularly to FIGS. 1-4, a dental appliance, constructed in accordance with the present invention and generally indicated by the numeral 15 is adapted to be worn by a person in engagement with the upper and lower teeth as illustrated by the models of upper and lower arches generally indicated by the numerals 16 and 17. The dental appliance 15 includes a resilient body 18, preferably of rubber, although any other suitable material may be employed, having an impression 19 for the teeth of the upper arch and an impression 20 for the teeth of the lower arch. The body is generally arch-shaped. Moreover, the impression 19 serves to receive the upper teeth of the model 16, while the impression 20 serves to receive the lower teeth of the model 17. While the dental appliance 15 is shown with impressions for the upper and lower teeth of a person and for all of the teeth on the upper and lower arches, it should be appreciated that a dental appliance could be constructed which would only have an impression for either the upper teeth or the lower teeth, or a portion of the upper or lower teeth, or any combination thereof. Moreover, the dental appliance of the present invention may serve as a conventional mouthpiece for protection of the teeth during athletic events and the like or it may constitute a tooth positioner such as that disclosed in the aforementioned patent, wherein the tooth sockets and the impressions on the appliance are arranged to urge certain teeth into preselected positions. In either event, the dental appliance of the present invention includes means for facilitating the proper mounting of a dental appliance in the mouth of a person.

The means for properly positioning the dental appliance in the mouth of a person and assuring the proper mating relationship between the teeth and the impressions includes in the embodiment of FIG. 7 positioning or orienting elements in the form of C-shaped clips generally designated by the numeral 21, as seen in FIG. 7. Each clip 21 includes an elongated buccallingual extending base portion 22 and opposed upstanding gingival extending arms 23, 24. The base portion 22 as well as a portion of the arms 23 and 24 are generally embedded in the body 18 to secure them to the body. However, any other suitable way of securing the clips to the body may be employed. The arms 23 and 24 are arcuate in shape and terminate in pointed and tapered ends 25 and 26, respectively, although it should be appreciated that the ends may be blunt if so desired.

Preferably, one C-shaped clip 21 is provided for each quadrant of the mouth, and in the dental appliance 15 as shown there would be four C-shaped clips, one for each of the upper and lower arches on each side of the mouth. If a lesser number of clips is deemed suitable, some of the clips may be omitted. And in situations where there would only be an impression in the appliance of either the upper or lower arches, a lesser number of clips would be employed. As seen in FIG. 7, the pointed ends 25 and 26 substantially face each other and project buccally and lingually, and are arranged to be received in the embrasure areas of the teeth.

Figure 5:
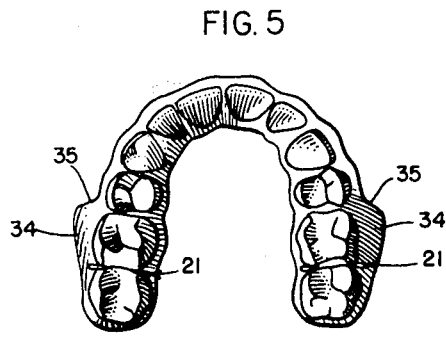
FIG. 5 is a bottom plan view of the dental appliance according to the present invention.
Figure 6:
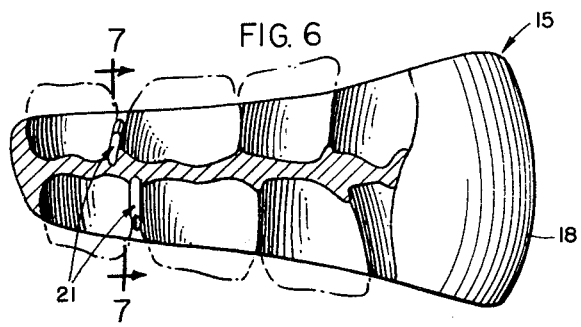
FIG. 6 is a side elevational view of a dental appliance of the present invention, with some parts broken away to show certain parts in section and other parts shown in phantom.

Preferably, the clips are arranged on the dental appliance as illustrated in FIGS. 2, 3, 5 and 6 so that they engage in the embrasure areas between the first and second molars, although it should be appreciated that the clips may be aranged in any suitable position to engage in any of the embrasure areas. The first and second molars are indicated respectively by the numerals 27 and 28 in the upper arch and by the numerals 29 and 30 in the lower arch. The embrasure or embrasure area is defined as that space radiating out from the contact point between adjacent teeth, the gingival embrasure or embrasure area being the space situated below the height of contour line, and the occlusal embrasure or embrasure area being the space situated above the height of contour line. First the gingival embrasure area is illustrated in FIG. 11 as the area betwen the contact point 31 of the molars 29 and 30 and in which area is generally received the inwardly projecting ends 25 and 26 of the arms 23 and 24 of the clips 21.

Placement of the dental appliance 15 in the mouth of a person thusly requires the initial positioning the C-shaped clips in alignment between the first and second molars after which the clips may be urged toward the gingival embrasure by applying pressure toward the teeth until the ends of the clips enter into the embrasure areas. At that time, it is known that the dental appliance is properly positioned. In a situation where a dental appliance constitutes a tooth positioning appliance for the final straightening of the teeth, and the teeth in the mouth are not in alignment with the sockets in the impressions of the appliance when the positioning appliance is in the mouth, it is sometimes necessary to stretch and/or elongate the appliance in order to obtain the proper seating of the teeth in the sockets of the impressions. Where no clips are provided, oftentimes the sockets are not properly seated and therefore, the tooth positioning appliance gives little benefit to the final straightening process of the teeth. Thus, with the clips, the person wearing the tooth positioning appliance can be assured of proper fitting and placement of the appliance within the mouth and thereafter receive greater benefit from the positioning appliance when worn.

To further assist in placement of a dental appliance in the mouth, enlarged portions or buttons 34 are formed on the buccal surface of the appliance and at the distal ends thereof to define shoulders 35. The shoulders 35 are adapted to receive the fingers of the person desiring to position the appliance in the mouth such as the ends of the first finger and thumb of a person in order to provide an area wherein the appliance may be gripped for elongation thereof in the final placement of the appliance in the mouth. However, the enlarged portions 34 are not sized so that they would cause any discomfort within the mouth.

The clips 21 may be made of any suitable material such as metal or plastic in wire or ribbon form. Actually the cross section of the clips may be of any desirable shape as long as the ends are formed so that they will fit in the embrasure areas between the teth. Preferably, the clips are made so that they are quite rigid or stiff.

Referring now to FIG. 8, a modification of the invention is illustrated wherein C-shaped clips 21A are shown which differ somewhat from the C-shaped clips 21 of FIG. 7 in that the upstanding arms 36 are connected to the buccal-lingually extending base portion 37 by means of spring loops 38. The spring loops 38 serve to define a resiliency between the arms 36 and the base portion 37, and the loops along with the base portion and a portion of the arms are embedded in the rubber body 18. Otherwise, the C-shaped clips 21A operate in the same manner as the C-shaped clips 21.

Another embodiment is shown in FIGS. 9 and 10, wherein the C-shaped clips of the embodiments of FIGS. 7 and 8 are replaced by sets of pins 39. Each pin 39 includes a serrated tail or anchoring portion 40 adapted to be embedded in the rubber body 18, a positioning flange 41 arranged to abut against the buccal and lingual facing surfaces of each impression, and a conical or pointed end 42 adapted to engage in the embrasure areas between the teeth. It should be appreciated that the pins 39 may take any suitable form, but in this case are individually mounted in the body of the appliance, preferably in pairs as shown in FIG. 9 so as to engage from opposite sides of the impression in the embrasure areas between teeth. The pins 39 may be made of metal, plastic or any other suitable material, and it should be appreciated that in some instances only a single pin may be used in one quadrant. In other words, a pair of pins 39 need not be used in cooperation with each other in order to provide the necessary positioning function for the present invention. Placement of an appliance having the pins would be similar to that of the embodiments of FIGS. 7 and 8.

It will be understood that modifications and variations may be effected without departing from the scope of the novel concepts of the present invention, but it is understood that this application is to be limited only by the scope of the appended claims.

The invention is hereby claimed as follows:

1. A dental appliance comprising a molded arch-shaped body of resilient material, said body being formed to fit within the mouth of a person between the upper and lower arches, said body including impressions of the teeth of at least one of the arches, said impressions having a bottom and opposite side walls, and at least one substantially rigid means supported by said body, said means having at least one terminal extremity projecting from said impression side walls to thereby engage in an embrasure area of the teeth of a wearer and orient the appliance in the mouth.

2. A dental appliance comprising a molded arch-shaped body of resilient material, said body being formed to fit within the mouth of a person between the upper and lower arches, said body including impressions of the teeth of at least one of the arches, said impressions having a bottom and opposite side walls, and at least one substantially rigid means supported by said body, said means having a plurality of terminal extremities projecting from said impression side walls to thereby engage in embrasure areas of the teeth of a wearer and orient the appliance in the mouth.

3. A dental appliance comprising a molded arch-shaped body of resilient material, said body being formed to fit within the mouth of a person between the upper and lower arches, said body including impressions of the teeth of at least one of the arches, said impressions having a bottom and opposite side walls, and at least one substantialy rigid means supported by said body, said means having at least a pair of opposed terminal extremities projecting from said impression side walls to thereby engage in embrasure areas of the teeth of a wearer and orient the appliance in the mouth.

4. A dental appliance comprising a molded arch-shaped body of resilient material, said body being formed to fit within the mouth of a person between the upper and lower arches, said body including impressions of the teeth of at least one of the arches, said impressions having a bottom and opposite side walls, and substantially rigid means supported by said body including a pair of opposed pins anchored in said body having terminal extremities projecting from said impression side walls to thereby engage in embrasure areas of the teeth of a wearer and orient the appliance in the mouth.

5. A dental appliance comprising a molded arch-shaped body of resilient material, said body being formed to fit within the mouth of a person between the upper and lower arches, said body including impressions of the teeth of at least one of the arches, said impressions having a bottom and opposite side walls, and at least one substantially rigid means supported by said body, said means including a substantially C-shaped member having opposed terminal extremities projecting from said impression side walls to thereby engage in embrasure areas of the teeth of a wearer and orient the appliance in the mouth.

6. A dental appliance comprising a molded arch-shaped body of resilient material, said body being formed to fit within the mouth of a person between the upper and lower arches, said body including impressions of the teeth of at least one of the arches, said impressions having a bottom and opposite side walls, and at least one substantially rigid means supported by said body, said means including a substantially C-shaped member having a bight portion embedded in the body below the bottom of the impressions and opposed terminal ends extending directly from the bight portion and projecting from said impression side walls toward one another to thereby engage in embrasure areas of the teeth of a wearer and orient the appliance in the mouth.

7. A dental appliance comprising a molded arch-shaped body of resilient material, said body being formed to fit within the mouth of a person between the upper and lower arches, said body including impressions of the teeth of at least one of the arches, said impressions having a bottom and opposite side walls, and at least one substantially rigid means supported by said body, said means including a pair of opposed terminal extremities resiliently urged toward one another to thereby engage in embrasure areas of the teeth of a wearer and orient the appliance in the mouth.

8. A dental appliance comprising a molded arch-shaped body of resilient material, said body being formed to fit within the mouth of a person between the upper and lower arches, said body including impressions of the teeth of at least one of the arches, said impressions having a bottom and opposite side walls, and at least one substantially rigid means supported by said body, said means including a substantially C-shaped member having a bight portion embedded in the body below the bottom of the impressions and opposed terminal ends extending from the bight portion and projecting from said impression side walls toward one another to thereby engage in embrasure areas of the teeth of a wearer and orient the appliance in the mouth, and loop portions between said bight portion and said terminal extremities causing said extremities to be resiliently urged toward one another.

9. A dental appliance comprising a molded arch-shaped body of resilient material, said body being formed to fit within the mouth of a person between the upper and lower arches, said body including impressions of the teeth of at least one of the arches, said impressions having a bottom and opposite side walls, and at least one substantially rigid means supported by said body, said means having at least one terminal extremity projecting from said impression side walls to thereby engage in an embrasure area of the teeth of a wearer and orient the appliance in the mouth, and finger engaging shoulders on the body for facilitating the mounting of the appliance on the teeth.

References Cited by the Examiner

UNITED STATES PATENTS

| | | | |
|---|---|---|---|
| 2,678,043 | 5/54 | Stark | 128—136 |
| 2,705,006 | 3/55 | Cettel et al. | 128—136 |

RICHARD A. GAUDET, *Primary Examiner.*

ROBERT E. MORGAN, *Examiner.*